(No Model.)

E. B. HYDE.
GRAIN REEL.

No. 501,424. Patented July 11, 1893.

WITNESSES:
F. L. Ourand
Jo. L. Coombs

INVENTOR:
Edward B. Hyde,
by Louis Bagger & Co.
Attorneys.

UNITED STATES PATENT OFFICE.

EDWARD B. HYDE, OF ELWOOD, IOWA.

GRAIN-REEL.

SPECIFICATION forming part of Letters Patent No. 501,424, dated July 11, 1893.

Application filed January 23, 1893. Serial No. 459,370. (No model.)

*To all whom it may concern:*

Be it known that I, EDWARD B. HYDE, a citizen of the United States, and a resident of Elwood, in the county of Clinton and State of Iowa, have invented certain new and useful Improvements in Grain-Reels; and I do hereby declare that the following is a full, clear, and exact description of the invention, which will enable others skilled in the art to which it appertains to make and use the same, reference being had to the accompanying drawings, which form a part of this specification.

My invention relates to improvements in reels for reaping machines, the object being to provide an improved construction of the same, whereby I obtain important advantages with respect to efficiency in operation.

The invention consists in the novel construction and combination of parts hereinafter fully described and claimed.

Figure 1:
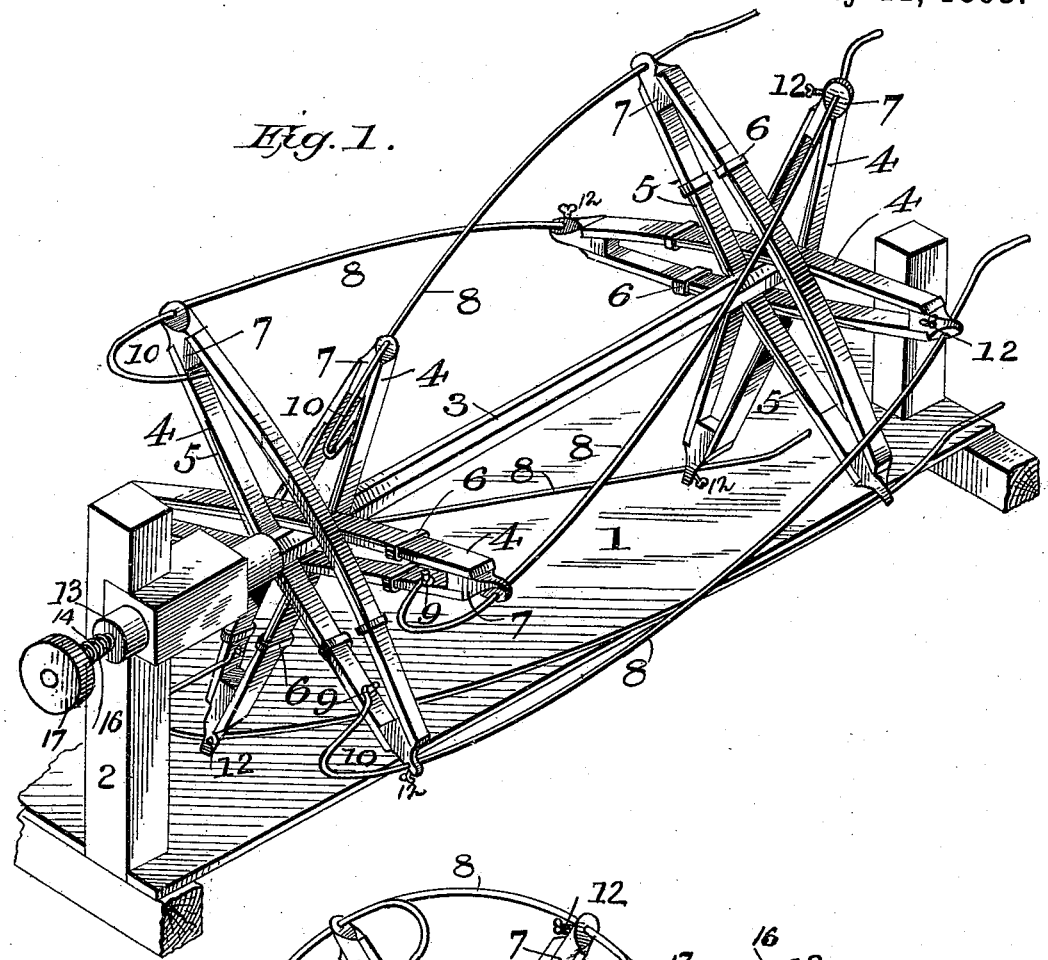
Figures 2, 3:
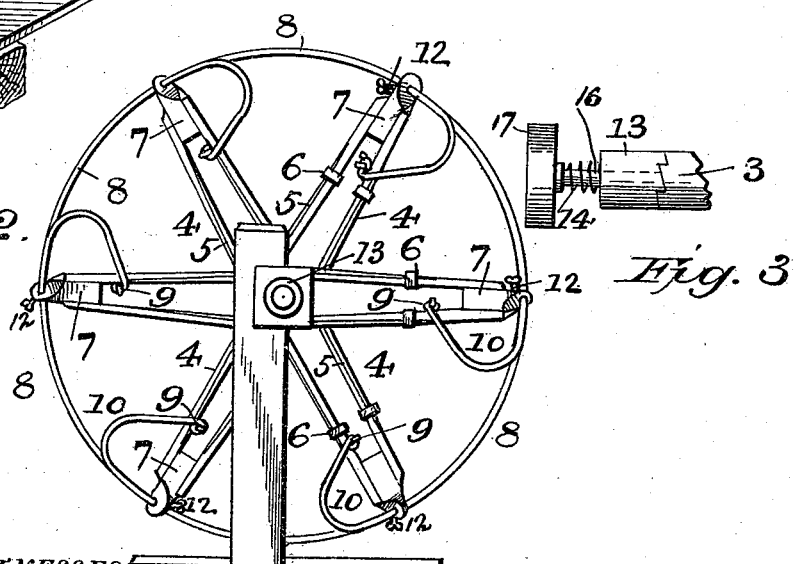

In the accompanying drawings: Figure 1 is a perspective view of a portion of a harvesting machine showing my improved reel applied thereto. Fig. 2 is an end view of the reel. Fig. 3 is a detail view.

In the said drawings the reference numeral 1 designates the platform, and 2 a standard in which the reel shaft 3 is journaled. Secured to this shaft are a number of radial arms 4, each consisting of four strips 5, of wood or other suitable material having their ends overlapping and secured together by means of clasps 6. The outer ends of these strips are separated by spacing blocks 7, to which the said strips are secured. These blocks have their outer ends cut away or reduced and provided with apertures.

The numeral 8 denotes a series of diagonal bars, each consisting of a wire rod having an eye 9 formed in one end and secured to the radial bars. These rods are bent outwardly and then inwardly, forming a curve 10, and passed through the apertures in the blocks secured to said radial arms. The bars 8 extend diagonally across the reel to the arm on the opposite end of the shaft 3, and pass through the apertures in the blocks secured thereto, where their ends are bent, so as to be parallel with the shaft 3. The rods or bars 8 are secured in the apertures in the blocks by means of set screws 12. By the peculiar construction above set forth, the grain is delivered square upon the platform, thus obviating the employment of "kickers" or "butters." The radial arms can also be readily adjusted, with respect to the length, when desired.

For the purpose of preventing the jar to the reel incident to the sudden starting and stopping of the same, I provide a flexible or yielding connection between the shaft of the reel and the driving mechanism, which is constructed as follows:

The numeral 13 designates a sleeve on the inner end of said shaft; the numeral 14 a coiled spring confined between the outer end of said sleeve and the collar 15 on the end of shaft 16, which communicates motion to shaft 3; and the numeral 17 designates the pulley on the outer end of the reel shaft.

Having thus described my invention, what I claim is—

In a harvester reel, the combination with the shaft, the radial arms secured thereto, each consisting of the wooden strips having their inner ends overlapping each other, the clasps, the blocks secured to said arms, having apertures in their ends, the curved diagonal bars passing through said apertures and secured to said arms, and the set screws for securing the said rods in place, substantially as described.

In testimony that I claim the foregoing as my own I have hereunto affixed my signature in presence of two witnesses.

EDWARD B. HYDE.

Witnesses:
 B. F. THOMAS,
 LUCILE THOMAS.